United States Patent [19]
Patel et al.

[11] Patent Number: 6,109,847
[45] Date of Patent: Aug. 29, 2000

[54] ORGANIZER FOR VEHICLE CARGO AREAS

[75] Inventors: Dakshesh Patel; James Nixon; Jeffrey L. Konchan, all of Oakland County, Mich.

[73] Assignee: Peregrine Incorporated, Southfield, Mich.

[21] Appl. No.: 08/962,937

[22] Filed: Oct. 28, 1997

[51] Int. Cl.[7] .................................................. B60P 7/14
[52] U.S. Cl. ......................... 410/129; 410/94; 410/121
[58] Field of Search .......................... 224/42.33, 42.34, 224/403, 550, 551, 554, 925, 547; 410/94, 121, 127, 129, 140, 145, 151; 296/37.1, 37.6; 220/530, 551

[56] References Cited

U.S. PATENT DOCUMENTS

| | | | |
|---|---|---|---|
| 4,236,854 | 12/1980 | Rogers | 410/121 |
| 4,538,737 | 9/1985 | Delaney . | |
| 4,718,584 | 1/1988 | Schoeny . | |
| 4,737,056 | 4/1988 | Hunt | 410/151 |
| 4,838,745 | 6/1989 | Haydock | 410/121 |
| 4,842,460 | 6/1989 | Schleich | 410/121 |
| 4,964,528 | 10/1990 | Wagner | 220/551 |
| 5,092,504 | 3/1992 | Hannes et al. | 410/151 X |
| 5,161,700 | 11/1992 | Stannis et al. . | |
| 5,215,205 | 6/1993 | Behlman . | |
| 5,259,719 | 11/1993 | Wayne | 410/129 X |
| 5,265,993 | 11/1993 | Wayne | 410/129 |
| 5,289,941 | 3/1994 | Blankenburg et al. . | |
| 5,366,189 | 11/1994 | Thompson . | |
| 5,518,170 | 5/1996 | Rasmussen . | |
| 5,520,316 | 5/1996 | Chen . | |
| 5,584,412 | 12/1996 | Wang . | |
| 5,628,442 | 5/1997 | Wayne | 224/42.34 X |
| 5,697,742 | 12/1997 | House | 410/127 |
| 5,709,512 | 1/1998 | Smith | 410/129 |

FOREIGN PATENT DOCUMENTS 667558 7/1963 Canada ............................ 224/42.33

Primary Examiner—Stephen T. Gordon
Attorney, Agent, or Firm—Rader, Fishman & Grauer PLLC

[57] ABSTRACT

An organizer for a vehicle cargo area has a telescoping cross member that is connected to a pair of end supports and can be adjusted to continuously variable lengths for fitting into different sized cargo areas. An optional accessory holder can be attached to the organizer and hold safety items such as battery jumper cables, flares, and/or first aid kits. Reflectors are provided on the organizer to improve its visibility, especially when used to warn approaching motorists of a disabled vehicle. The telescoping cross member can also be slidingly attached to the end supports to further allow adjustability in the fore and aft directions.

8 Claims, 5 Drawing Sheets

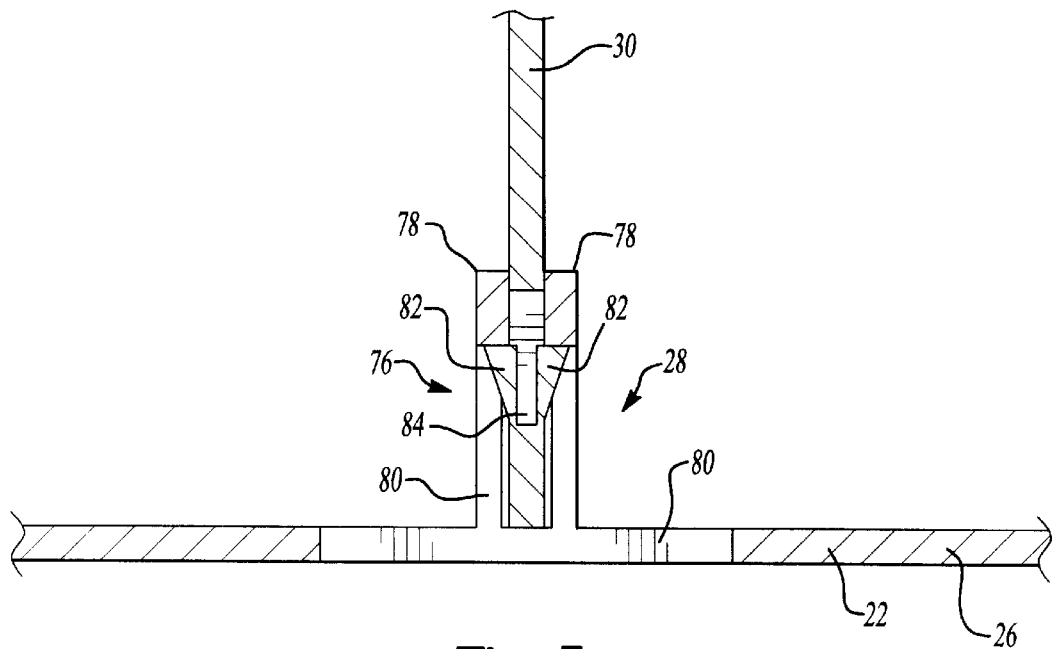
Fig-3
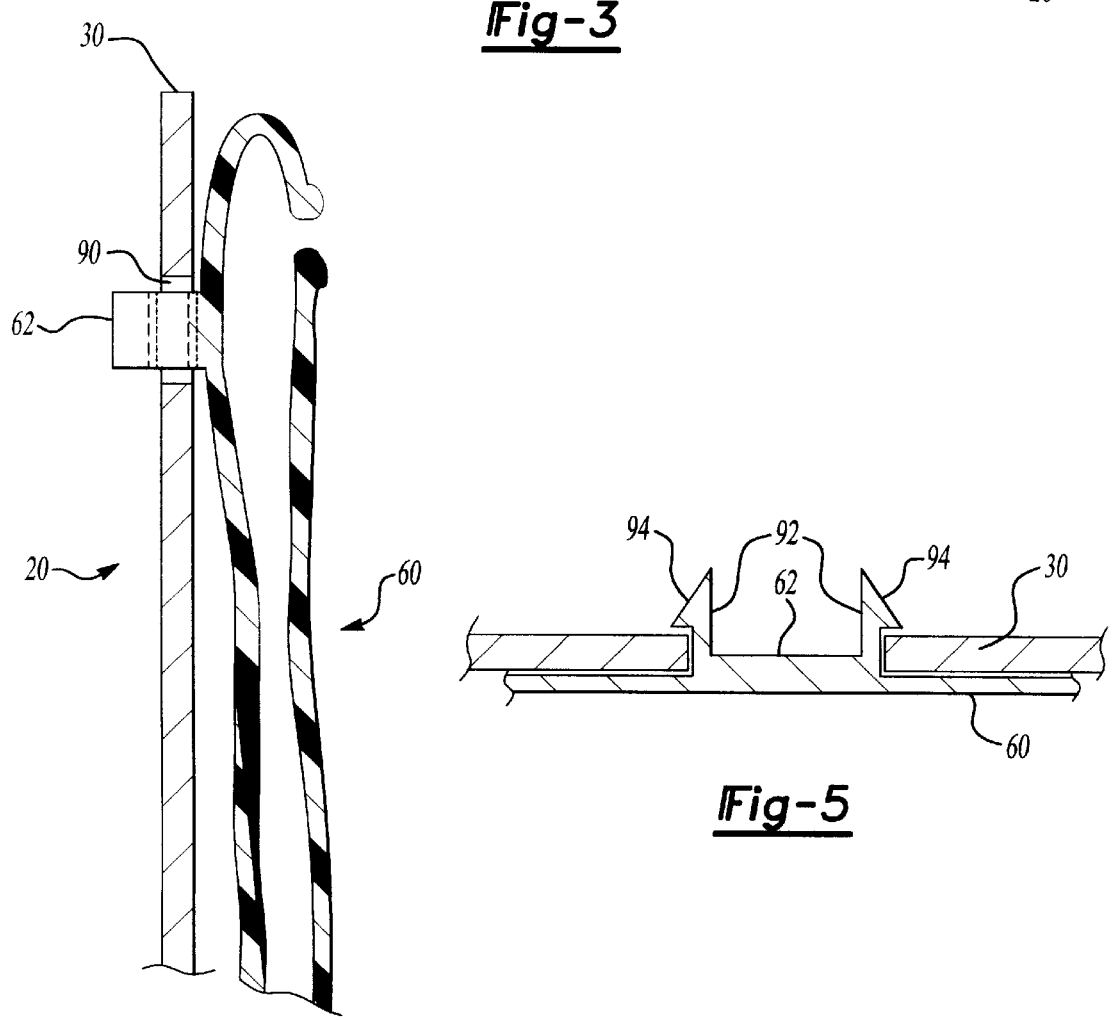
Fig-4
Fig-5

ORGANIZER FOR VEHICLE CARGO AREAS

FIELD OF THE INVENTION

The present invention relates to an organizer for a vehicle cargo area and, more articularly, to a telescopically adjustable vehicle cargo organizer that can be selectively extended or collapsed to fit within different sized cargo areas.

BACKGROUND OF THE INVENTION

Organizers for vehicle cargo areas are known. Organizers can be used to compartmentalize vehicle cargo areas, such as a trunk, and help users efficiently place and store various items such as bags of groceries, files, or automotive supplies. Organizers also help prevent undesired shifting and mixing of these various items during transit, which can include sharp turns, steep hills and quick stops.

One known organizer includes a base plate having fixed side walls and a sliding intermediate divider that laterally adjusts for different sized items that may be placed on the base plate. Telescoping rods can be connected between one fixed side wall and the sliding divider to support the side wall and divider and to prevent packages from tipping. However, the size of the base plate is not adjustable.

Another organizer has a base plate with openings to receive removable divider walls. The organizer allows a user to create different sized compartments on the base plate by re-orienting the divider walls to efficiently receive items having different sizes. The divider walls can be clamped together to securely retain items during transit. However, the size of the base plate itself cannot be adjusted to accommodate different cargo area sizes.

Yet another organizer has a pair of elongated dividers that form an "X"-shape and have attachment points for elastic cords. A user can place items such as grocery bags in the regions bounded by the dividers and then elastic cords can be securely fastened to the dividers to the hold the items in place. However, the "X"-shaped organizer does not allow selective adjustment of its length.

Thus, the known organizers have fixed overall sizes. Moreover, these organizers do not provide added safety for a stranded motorist.

SUMMARY OF THE INVENTION

The present invention is directed to an organizer for a vehicle cargo area including a pair of end supports, each one having a base and a vertical wall. A telescoping cross member extends between the end supports and has its distal ends connected to respective vertical walls of the end supports. The cross member includes plate segments that slide relative to one another in a longitudinal direction and have complementary shaped guide portions preventing their relative movement in a lateral direction. An intermediate support can be provided at a predetermined location along the cross member to provide added support and rigidity. Therefore, the present invention can be easily extended or collapsed to fit within different space requirements of vehicle cargo areas. As the size of a cargo area changes, so can the organizer. Further, the connections provided to assemble the organizer are removable to facilitate easy disassembly for storage purposes or for transfer to another vehicle cargo area.

In addition, safety items can be provided on the organizer to eliminate or diminish dangerous situations. For example, an accessory holder is removably attached to the organizer and can hold such safety items as battery jumper cables, tools, first aid kits, flares, etc. Also, reflectors can be provided on the organizer. The reflectors increase visibility, allowing a stranded motorist to remove the organizer from a cargo area and place it away from a stranded vehicle to alert on-coming vehicles that a potential hazard is ahead.

Another embodiment of the present invention further provides fore and aft adjustment of the cross member relative to the end supports. Guide members having an inverted "U" shape are slidingly received on the end supports and include locking pins to selectively engage apertures provided in the end supports. Thus, the second embodiment can adjust the cross member in two different axes, telescopically and fore and aft, providing greater flexibility to a user when dividing a cargo area.

The present invention provides a vehicle cargo organizer that has relatively few parts, can be readily assembled and can be easily extended or collapsed to change its overall size. Accordingly, the present cargo organizer has greater versatility and can be adapted to efficiently fit within many different cargo areas having varying sizes. Also, the present organizer improves the safety of the user by providing necessary repair items and a cautionary warning structure.

BRIEF DESCRIPTION OF THE DRAWINGS

The features and inventive aspects of the present invention will become more apparent upon reading the following detailed description, claims, and drawings, of which the following is a brief description:

FIG. 3 is a partial cross-sectional view taken along line 3—3 of FIG. 1.

FIG. 4 is a partial cross-sectional view taken along line 4—4 of FIG. 1.

FIG. 5 is a partial cross-sectional view taken along line 5—5 of FIG. 1.

DETAILED DESCRIPTION OF PREFERRED EMBODIMENTS

Figure 1:
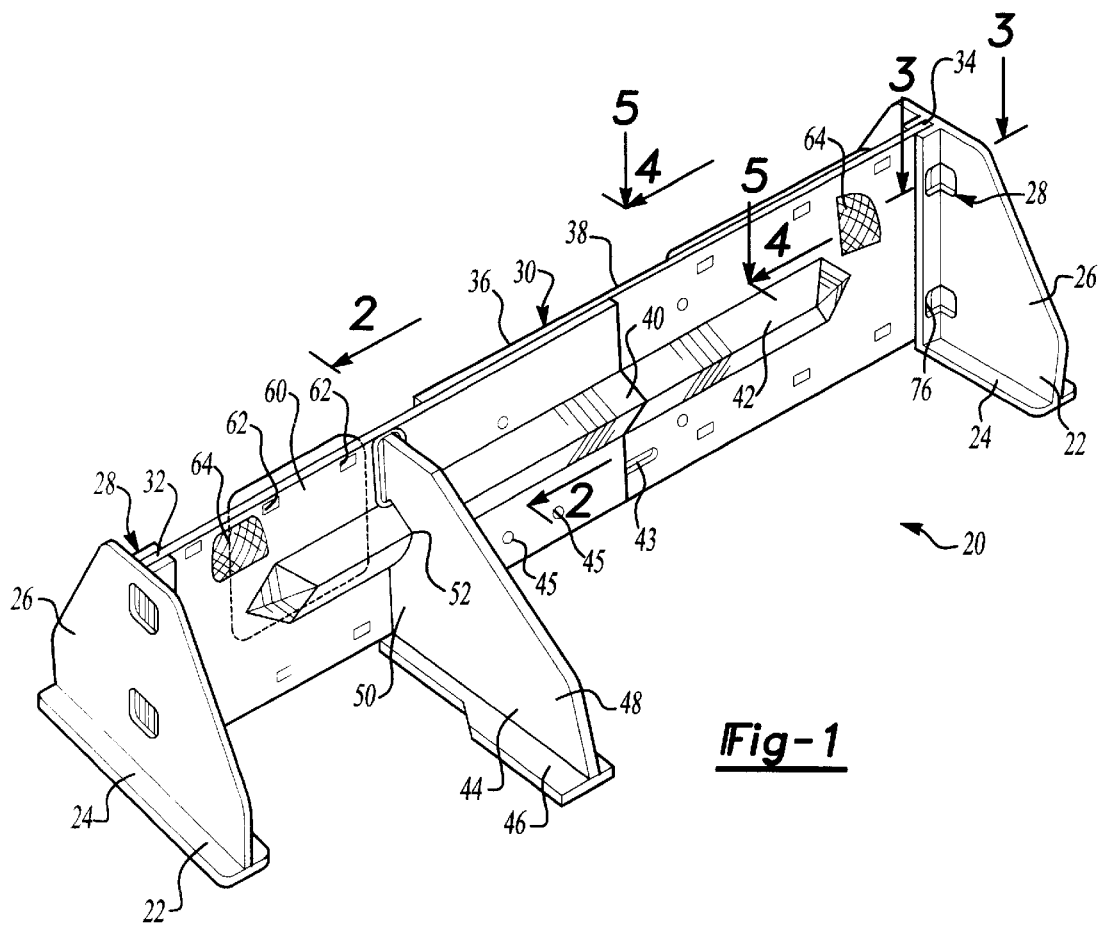
FIG. 1 is a perspective view of an organizer according to the present invention.

FIG. 1 shows an organizer 20 for a vehicle cargo area (not shown), such as a car trunk, to divide and organize the contents of a cargo area. Organizer 20 includes a pair of spaced apart end supports 22, each having a horizontal base 24 supporting a vertical wall 26. Connecting portions 28 are provided on end supports 22 for attaching a cross member 30 between the end supports 22.

Cross member 30 has first and second distal ends 32, 34 that attach respectively to vertical walls 26 of end supports 22. Cross member 30 further includes first and second vertical plate segments 36, 38 that nest together and are telescopically connected to enable sliding of first plate segment 36 relative to second plate segment 38. Relative sliding of plate segments 36, 38 allows adjustment of the length of cross member 30 and thereby adjust the length of organizer 20 to fit in different sized cargo areas or collapse to a smaller size within a given cargo area. First and second guide members 40, 42 are provided on respective plate segments 36, 38 and have complementary features to allow guiding of plate segments 36, 38 during telescopic movement. Guide members 40, 42 are shown in FIG. 1 in the form of "V"-shaped lateral projections that nest, one inside the other, preventing relative movement of plate segments 36, 38 in the vertical direction, but allowing their linear movement in the longitudinal direction of cross member 30. Forming guide members 40, 42 in a "V"-shape also provides increased structural rigidity to plate segments 36, 38 to resist bending and flexing.

Although a "V"-shaped projection is shown, any suitable form of complementary features can be provided. A few examples of complementary shaped features include a pin cooperating in a slot, or a "T"-shaped or "S"-shaped configuration.

Cooperating with guide members 40, 42, during telescopic movement, is a horizontal slot 43 that slidably receives one or more fastener pins 45. Fastener pins 45 slide within slot 43 but cannot be easily removed from slot 43. Thus, plate segments 36, 38 are connected together by fastener pins 45.

In addition, an intermediate support 44 is selectively positioned at a location along cross member 30 to provide increased lateral support to organizer 20. Intermediate support 44 includes a horizontal base 46 connected to a vertical wall 48 having a front flange 50 to contact cross-member 30 Vertical wall 48 has a cut-out portion 52 to accommodate guide members 40, 42.

Optionally, but preferably, an accessory holder 60 is provided on organizer 20 to increase carrying capacity and centralize storage of otherwise loose, individual items (not shown). Accessory holder 60 can attach anywhere on organizer 20, but is shown attached to cross member 30. Holder 60 can be any suitable carrying device including, for example, a pouch, bag, box, hook, case, basket, hanger, etc. In the preferred embodiment, holder 60 is a pouch for carrying a number of items (not shown), such as, battery jumper cables, a safety light, flares, first aid kit, tools, elastic tie-down cords, rope, etc., to assist a motorist in case of an emergency or a breakdown. Holder 60 can be attached using any suitable attachment device 62, including mechanical fasteners or adhesive bonding. Preferably, holder 60 is removably attached using a snap fit connection that allows re-attachment of holder 60 after removal for an emergency.

A plurality of reflectors 64 are also provided on organizer 20 to increase its visibility in a darkened cargo area (not shown). Moreover, organizer 20 can be removed from the cargo area and placed on the ground nearby a non-moving, disabled vehicle (not shown) and reflectors 64 will reflect headlights of on-coming vehicles. Thus, organizer 20 can be used to forewarn other motorists of an approaching potential hazard caused by the non-moving vehicle to protect both the disabled motorist and other motorists.

Figure 2:
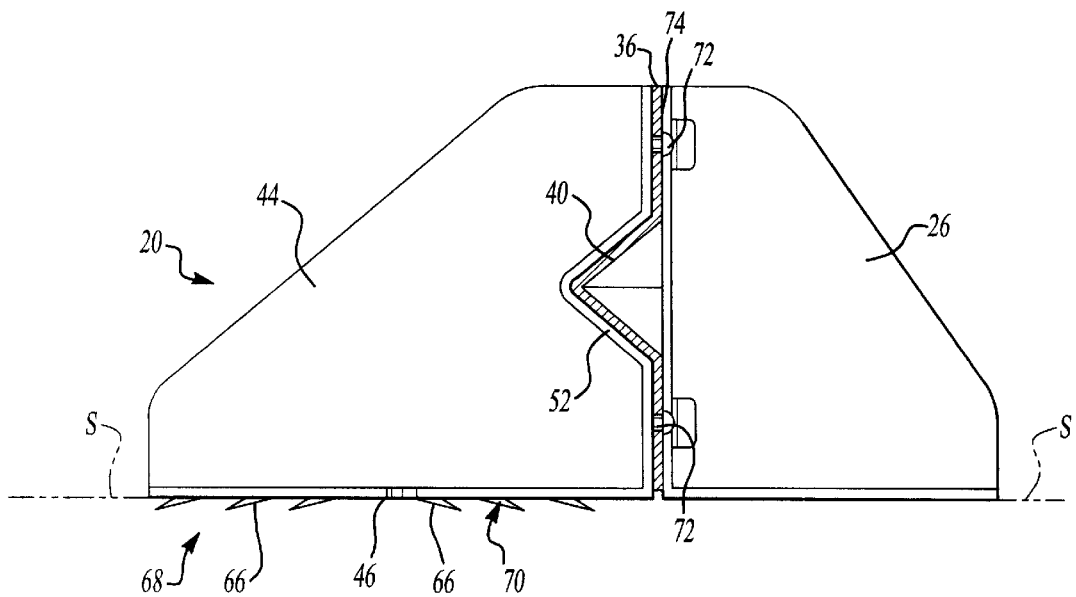
FIG. 2 is a cross-sectional view taken along line 2—2 of FIG. 1.

FIG. 2 shows a cross-sectional side view of organizer 20 including cutout 52 in intermediate support 44 for accommodating laterally projecting guide member 40. One or more barbs 66 are optionally provided on base 46 of intermediate support 44 for securely positioning organizer 20 and preventing unwanted sliding. Barbs 66 project downwardly and can be angled in the same or opposite directions. As illustrated, a first group of barbs 68 are angled to the left while a second group of barbs 70 are spaced away from the first group 68 and angle to the right. Thus, barbs 66 can grip fabric (not shown), such as carpet, and prevent relative movement between organizer 20 and the cargo area (not shown). Although barbs 66 are shown only on intermediate support 44, it should be understood that other elements can have barbs located thereon. For example, end supports 22 can have barbs 66 to further prevent unwanted shifting and sliding of organizer 20.

Intermediate support 44 further includes fastening devices 72 for attaching intermediate support 44 to cross member 30. In the illustrated embodiment, fastening devices 72 are mushroom-shaped male projections designed to interlock with mating orifices 74 in cross member 30. Alternatively, fastening devices 72 can be any suitable device that allows easy assembly and secure attachment. VELCRO or a snap fit connection are just two examples of how to attach intermediate support 44 to cross member 30. Preferably, fastening devices 72 facilitate easy disassembly for storage when an organizer is not needed or to facilitate transfer to another vehicle cargo area.

FIG. 3 illustrates part of a connecting portion 28 of end support 22 and its corresponding connector 76 located on cross member 30. Connecting portion 28 includes a pair of spaced apart elongated ribs 78 on vertical wall 26. Cutouts 80 are provided at selected locations in both vertical wall 26 and ribs 78 to allow connector 76 to interlock between ribs 78. Connector 76 includes a pair of spaced apart ramps 82 having a recess 84 therebetween. During insertion of connector 76 between ribs 78, ramps 82 are forced toward each other until reaching cutout 80 where ramps 82 once again assume their spaced apart free state. As shown, a mechanical interlock exists between ramps 82 and ribs 78 that prevent unwanted disassembly between cross member 30 and end support 22. Four connectors 76 are illustrated in FIG. 1, however, any number of connectors 76 can be used, as needed. Preferably, connecting portion 28 and connector 76 facilitate selective disassembly of organizer 20 for storage when an organizer is not needed or to facilitate transfer to another vehicle cargo area.

FIGS. 4 and 5 show one way that accessory holder 60 can be attached to organizer 20. FIG. 4 is a side view showing accessory holder 60 generally parallel to cross member 30 and having attachment device 62 for snap fitting engagement within an opening 90 located in cross member 30. As shown in FIG. 5, attachment device 62 has a pair of spaced apart legs 92 including ramps 94 for snap fitting engagement with cross member 30. Legs 92 deflect toward each other during insertion into opening 90 and then return to their original positions such that ramps 94 prevent unwanted removal from opening 90. Alternatively, attachment device 62 can be mushroom-shaped.

Figure 6:
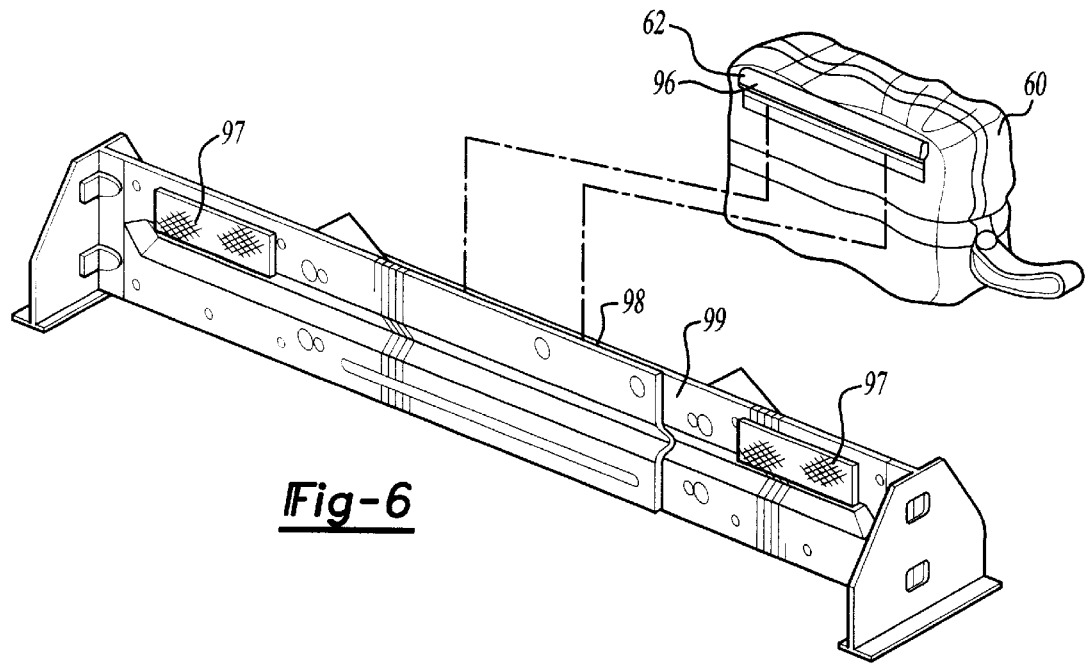
FIG. 6 is a perspective view of another embodiment attachment device for the present invention.

FIG. 6 shows an alternate attachment device 62 for accessory holder 60. Instead of individual connectors, a one-piece elongated clip 96 can be attached to accessory holder 60 and clip onto an upper edge 98 of cross member 99. Using an elongated clip 96 increases the load receiving area and distributes the load more evenly than individual fastening members. Attachment device 62 is preferably a reusable fastener that can be readily removed and re-attached numerous times to allow selective removal of accessory holder 60 and its subsequent re-attachment to organizer 20. Reflectors 97 are also shown attached to upper corner areas of cross member 99.

Figure 7:
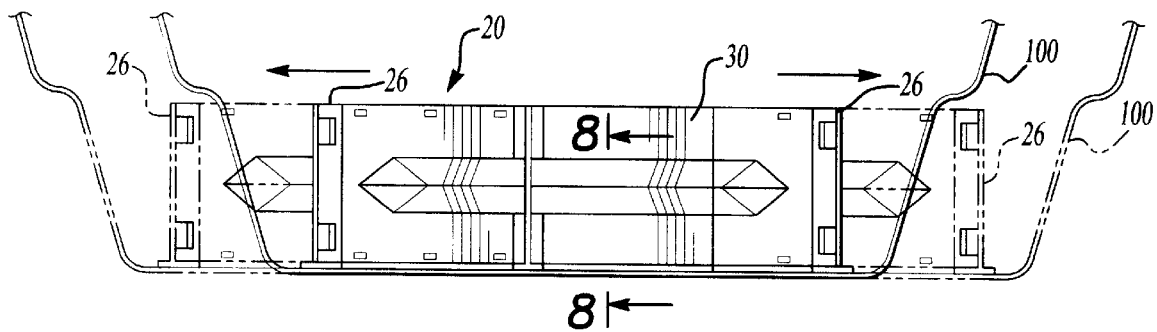
FIG. 7 is an elevational view of an organizer according to the present invention.
Figure 8:
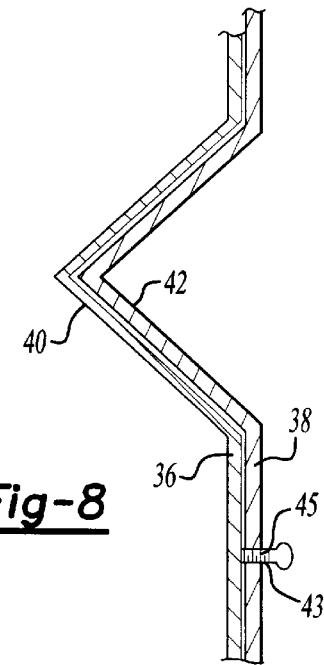
FIG. 8 is a partial cross-sectional view taken along line 8—8 of FIG. 7.

FIGS. 7 and 8 show the telescopic feature of cross member 30. More specifically, FIG. 7 shows how cross member 30 can be elongated to accommodate different sized cargo areas 100 (shown in phantom). Thus, organizer 20 can be used in numerous different sized cargo areas 100. Also, organizer 20 can be collapsed within a same sized cargo area 100 to account for a pre-existing obstruction, such as a spare tire or a tool box.

FIG. 8 shows a cross-section of plate segments 36, 38 of cross member 30, including "V"-shaped guide members 40, 42. First plate segment 36 can slide longitudinally relative to second plate segment 38. However, guide members 40, 42 prevent relative movement in the vertical direction. Also, slot 43 and fastening pin 45 are shown preventing separation of first plate segment 36 from second plate segment 38.

Figure 9:
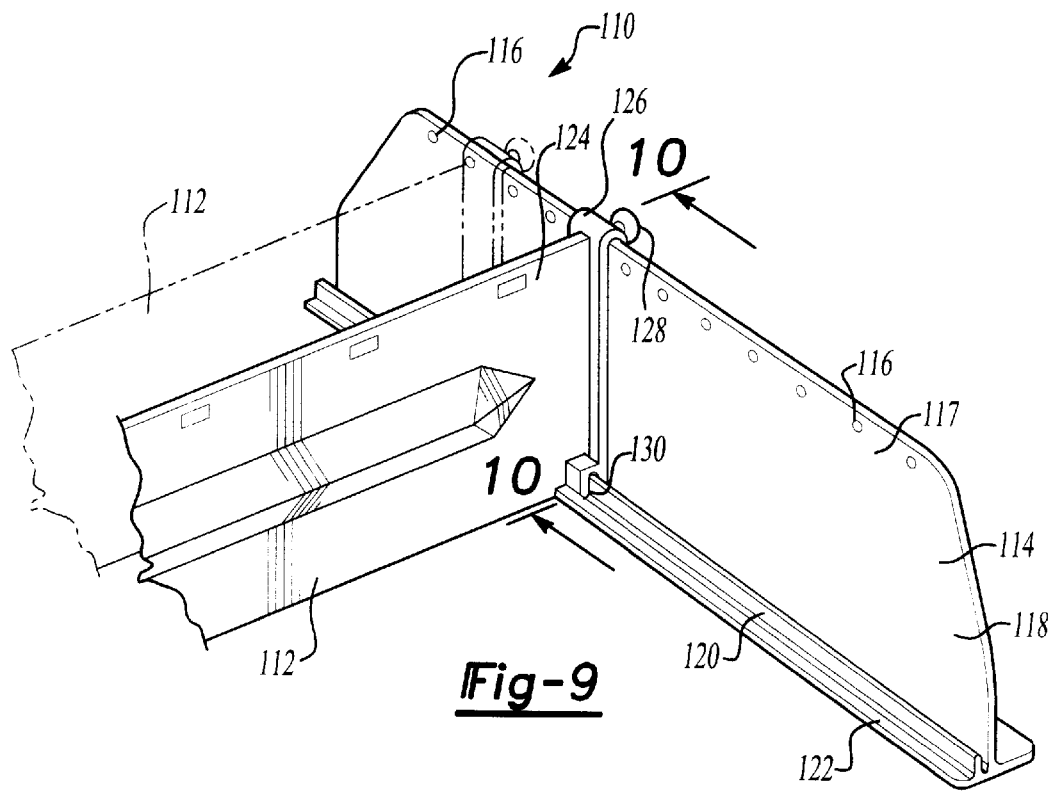
FIG. 9 is a partial perspective view of another embodiment of the present invention.
Figure 10:
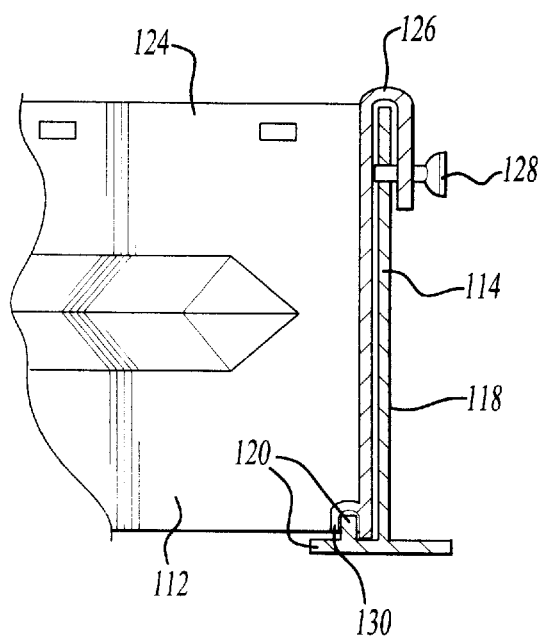
FIG. 10 is a cross-sectional view taken along line 10—10 of FIG. 9.

FIGS. 9 and 10 show an alternate embodiment of an organizer 110 according to the present invention that provides fore and aft adjustment as well as lateral adjustment. Organizer 110 has many of the same features as organizer 20 including a cross member 112 that allows telescoping lateral adjustment. However, instead of a fixed connection between cross member 112 and end support 114, a movable connection is provided. End support 114 has a series of spaced apart apertures 116 along an upper portion 117 of vertical wall 118. A guide rail 120 is located on base 122 of end support 114 and extends parallel to vertical wall 118. Guide rail 120 has a height that is much smaller than vertical wall 118. Distal end 124 of cross member 112 has a first guide 126 that has an inverted "U" shape that slidingly fits over vertical wall upper portion 117. First guide 126 further includes a locking pin 128 that is selectively received in apertures 116 to maintain cross member 112 in a selected location.

A second guide 130 having an inverted "U" shape is provided on distal end 124 for sliding engagement with guide rail 120. Thus, cross member 112 can be moved from a forward position along end support 114 to a rearward position and can be selectively locked in predetermined locations therebetween, as defined by apertures 116. Accordingly, organizer 110 can be adjusted in two different axes to easily change the size of divided areas in a cargo area.

Alternatively, end supports 114 can be made sufficiently long so that additional cross members 112 can be added to further subdivide a cargo area. For purposes of illustration, one additional cross member 112 is shown in phantom in FIG. 9.

Figure 11:
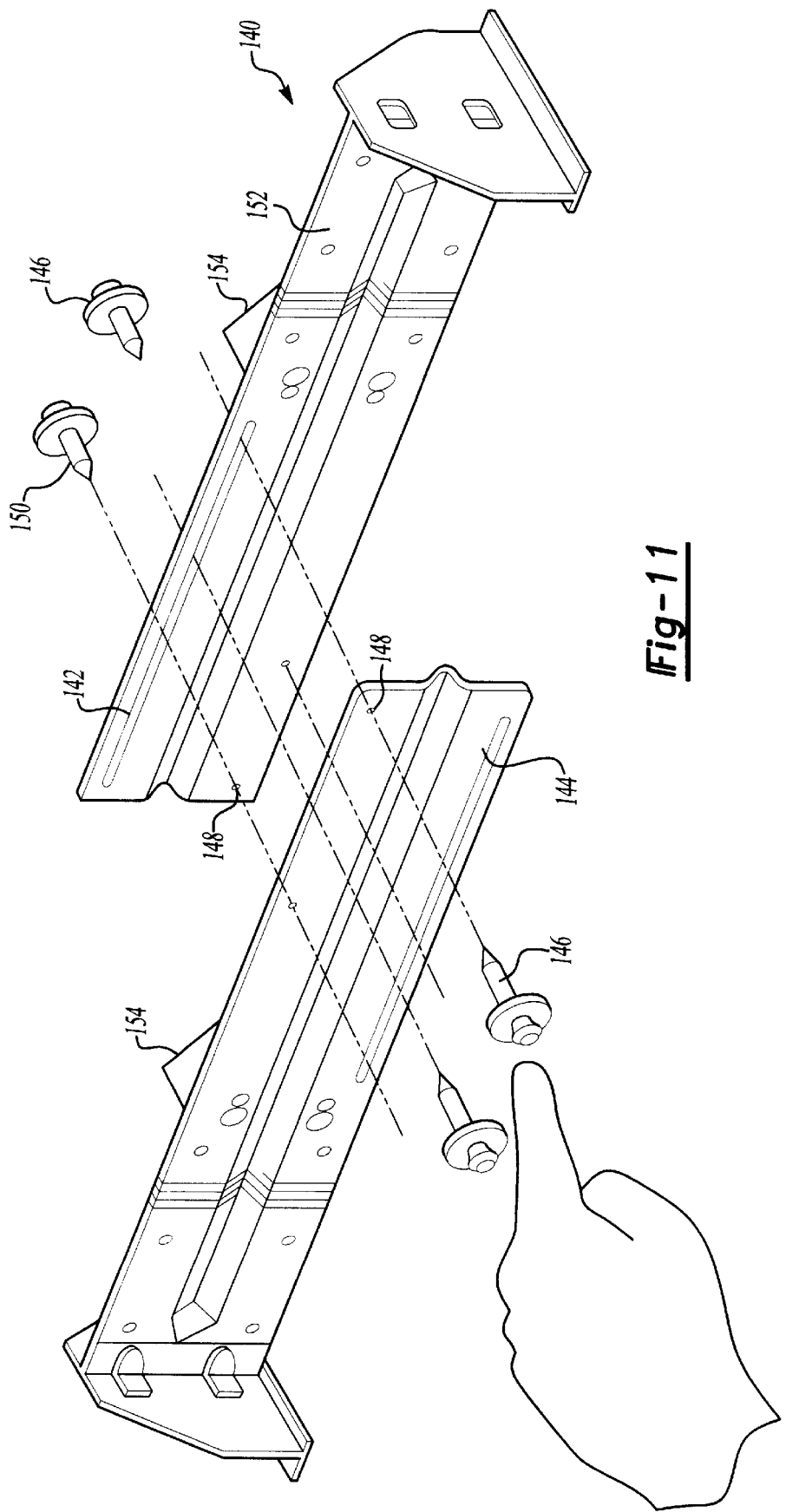
FIG. 11 is a perspective view of a third embodiment of the present invention.

FIG. 11 shows still another embodiment of the present invention. Organizer 140 has a pair of upper and lower slots 142, 144. Fasteners 146 are secured in openings 148 such that shanks 150 of fasteners 146 are guided within slots 142, 144. Thus, telescopic movement of cross member 152 is achieved with reduced chance of hinging or skewing. In addition, by providing dual slots and accompanying fasteners, as opposed to a single slot, the amount of stress is reduced. A pair of intermediate supports 154 are also provided in the present embodiment to increase rigidity and further distribute loading.

One of ordinary skill in the art will understand that organizers 110, 140 can selectively include some of the features of organizer 20 such as reflectors, accessory holders, and intermediate supports. In addition, organizer 20, 110, 140 can include more than one cross member to further subdivide a cargo area. For example, end supports can be made sufficiently long to accommodate a plurality of cross members. Thus, one end support would support a plurality of cross members. Further, a common intermediate support can be provided that engages plural cross members. Finally, all of the attachment and connection devices employed to assemble organizer 20, 110, 140 can be selectively removable to facilitate quick disassembly when an organizer is not needed or when transferring an organizer to a different cargo area.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. An organizer for a cargo area of a vehicle comprising:
    first and second end supports, each of said end supports having a base connected to a vertical wall;
    a cross member having first and second distal ends connected respectively to said first and second end supports, said cross member further including at least first and second plate segments connected together telescopically for selectively varying a length of the cross member;
    an intermediate support located at a predetermined location along said cross member and contacting said cross member to provide additional lateral support and rigidity, said intermediate support having a generally horizontal base connected to a generally vertical wall, wherein said base of said intermediate support and said base of each of said first and second end supports have a common surface of contact; and
    at least one accessory holder attached to said organizer for providing additional carrying capacity and centralized storage of individual items.

2. The organizer of claim 1, wherein said first and second plate segments have respective first and second guide portions that include complementary features to allow guiding of said plate segments during telescopic movement.

3. The organizer of claim 2, wherein said complementary features are generally "V"-shaped.

4. The organizer of claim 2, wherein said first end support further includes a pair of spaced apart ribs on said vertical wall having at least one cutout for positively receiving a connector on said first distal end of said cross member.

5. The organizer of claim 4, wherein said connector is selectively releasable and includes a pair of ramps that resiliently pass between said spaced apart ribs and snap fittingly connect said cross member to said first end support.

6. The organizer of claim 1, further comprising at least one reflector located on said organizer to increase its visibility.

7. An organizer for a cargo area of a vehicle comprising:
    first and second end supports each having a generally horizontal base connected to a generally vertical wall, said first and second end supports being spaced apart to define ail overall length of said organizer;
    a telescoping cross member having first and second distal ends, wherein said first distal end is connected to said first end support and said second distal end is connected to said second end support;
    wherein said cross member further includes a first plate segment and a second plate segment, said first plate segment having at least one fastener associated therewith and said second plate segment having at least one elongated horizontally extending slot formed therein, such that said at least one fastener is slidingly engaged with said slot;
    wherein said first and second plate segments are connected in a telescoping manner to enable sliding of said first plate segment relative to and alongside said second plate segment for selectively varying a length of the cross member to thereby vary the spacing of said first and second end supports and thus the overall length of said organizer;

said organizer further comprising an intermediate support located at a predetermined location along said cross member and contacting said cross member to provide additional support and rigidity, said intermediate support having a generally horizontal base connected to a generally vertical wall, wherein said base of said intermediate support and said base of said first and second end supports have a common surface of contact.

8. An organizer for a cargo area of a vehicle comprising:

first and second end supports each having a generally horizontal base connected to a generally vertical wall, said first and second end supports being spaced apart to define an overall length of said organizer;

a telescoping cross member having first and second distal ends, wherein said first distal end is connected to said first end support and said second distal end is connected to said second end support;

wherein said cross member further includes a first plate segment and a second plate segment, said first plate segment having at least one fastener associated therewith and said second plate segment having at least one elongated horizontally extending slot formed therein, such that said at least one fastener is slidingly engaged with said slot;

wherein said first and second plate segments are connected in a telescoping manner to enable sliding of said first plate segment relative to and alongside said second plate segment for selectively varying a length of the cross member to thereby vary the spacing of said first and second end supports and thus the overall length of said organizer;

and further wherein said first end support further includes a pair of spaced apart ribs on said vertical wall having at least one cutout for positively receiving a selectively releasable connector on said first distal end of said cross member.

\* \* \* \* \*